Patented Oct. 18, 1938

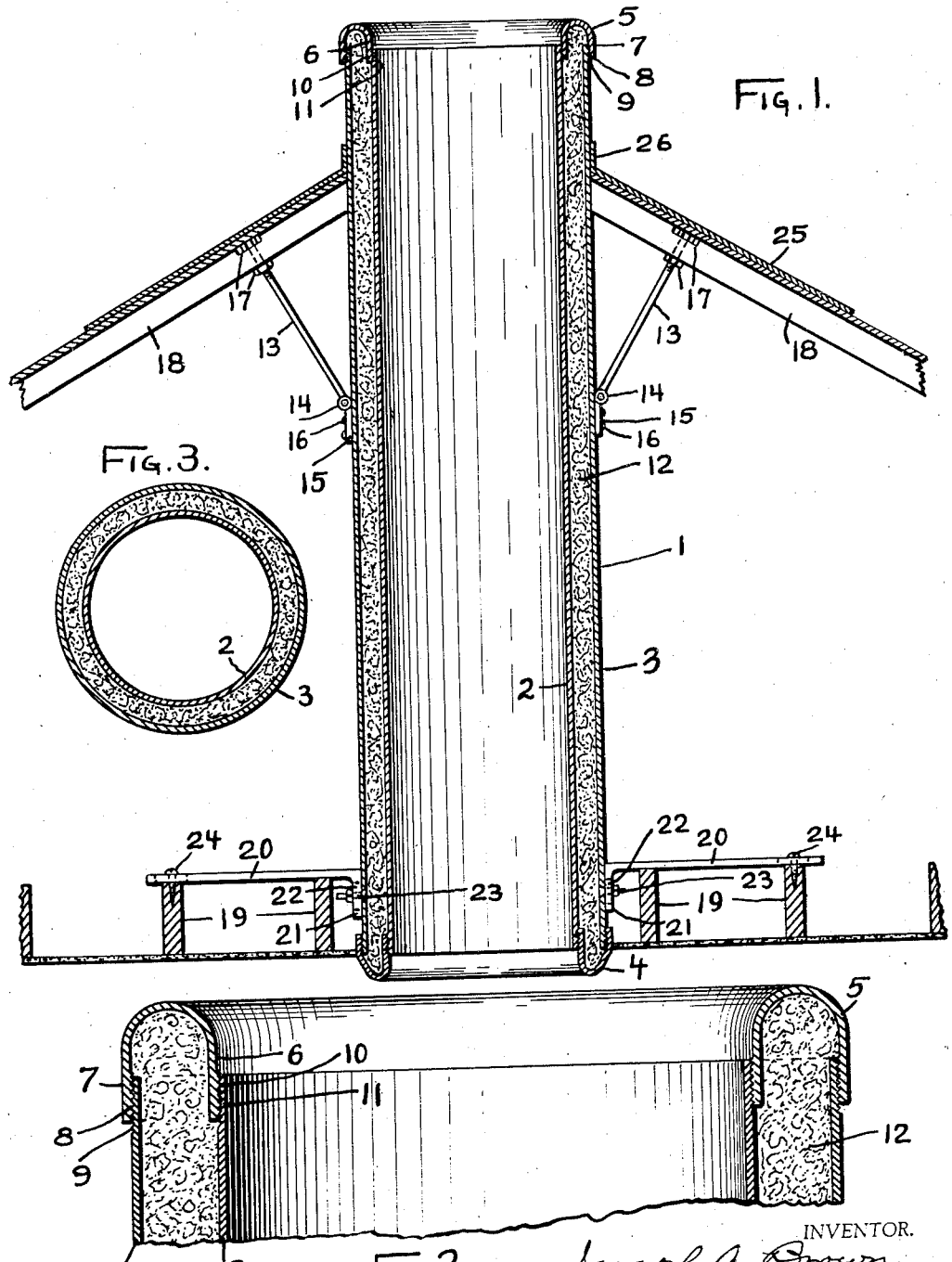

2,133,376

UNITED STATES PATENT OFFICE 2,133,376

FIRE PROTECTION UNIT

Joseph A. Brown, Colorado, Tex., assignor of one-half to The Philip Carey Manufacturing Company, a corporation of Ohio Application September 21, 1936, Serial No. 101,724

7 Claims. (Cl. 72—94)

This invention relates to a fire protection unit for separating parts of heating equipment from surrounding combustible materials, and particularly pertains to a fire prevention unit adapted to be interposed between the flue pipes in buildings and adjacent parts of the building construction in order to prevent ignition of any combustible material in the building or a part thereof which is around or adjacent the flue pipes.

The invention comprises generally multiple tubular members of different diameters associated together in juxtaposition, one within another, and spaced apart to provide an intermediate chamber that may advantageously be filled with suitable insulating material. The construction is made up as a unit which may be readily installed in a building construction surrounding the flue pipe to separate and protect same from adjacent parts of a building. The tubular members are preferably, except as to diameters, of the same construction and may be provided with means by which they are readily secured together.

For a better understanding of the invention, reference may be made to the accompanying drawing in which:

Fig. 1 is a vertical cross-sectional view of a portion of a building having a fire protection unit embodying the invention installed therein;

Fig. 2 is an enlarged vertical cross-sectional view of one end of the composite unit; and Fig. 3 is a horizontal cross-sectional view on line 3—3 of Fig. 1.

Referring specifically to the drawing in which like numerals are used to designate like parts, numeral 1 designates generally a protection unit constructed from tubular members 2 and 3 of the same coutour but of different diameters. They are coextensive in length and of sufficient varying diameters so that when one is inserted within the other, there will be a substantial space or chamber intervening between the walls of the tubular members. They may be secured by any suitable means in concentric relation. For this purpose, they each may be provided with screw threads preferably on the ends of the exterior walls to receive end collars 4 and 5 that are provided with sets of screw threads for being screw-threadedly attached to the ends of both tubular members. The assembly could be effected in the same manner by having the screw threads on the interior walls. The collars generally are of the same construction, but the outer wall of the collar 4 may be slightly tapering in order that it may be more easily fitted in a hole formed in the ceiling of the building structure to receive same. The collars are advantageously made from a single piece of the metal material bent to provide spaced flanges 6 and 7. The tubular members and collars, to be light in weight, may advantageously be made from aluminum material. The outer flange 7 is internally threaded at 8 to engage the screw threads 9 on the tubular member 3, and the other flange 6 is provided with screw threads 10 to engage the screw threads 11 on the end of the other tubular member 2. One of the collars may be first assembled on the respective ends of the two tubular members to hold them in spaced relation and before the other collar member is applied the intervening chamber between them may be advantageously filled with any suitable non-combustible filling material 12 such as asbestos fiber, mineral wool or the like. The walls of the tubular members are preferably spaced about two inches apart.

The flue protector may be advantageously secured to the roof and ceiling rafters or other surrounding structure of the building in which it is installed by suitable fastening means. This fastening means is typified by one or more sub-hangers 13, which are in the form of a rod pivoted at one end 14 to a fin 15 secured at 16 to the outer wall of the protector and screw threaded on the other end. With nuts 17 associated with the screw threaded end, the hanger may be clamped to adjacent roof rafters 18 of the building construction. By having the hangers pivotally attached to the flue protector, they may be readily swung about to the desired position for attachment to the rafters.

Another set of hangers may also be provided near the opposite end of the protector for attaching to the ceiling beams or rafters 19. These are typified by one or more rods 20 having a flanged end 21 provided with an elongated slot 22 therein. The flanged end of the rod is attached to the flue protector by a bolt 23 projecting through the tubular member 3 and the elongated slot 22 in the flanged end 21 of rod 20. By means of the elongated slot vertical adjustment may be effected so that the hangers may be properly positioned in relation to the ceiling beams or rafters 19 of the building to which they are secured. Any suitable means such as a wood screw 24 may be provided in the ends of the hangers to engage them with the ceiling beams or rafters. Any other suitable means may be used for securing the fire protector unit in place.

An apron member 25 may be provided on the exterior of the roof to effect a water-tight connection around the flue protection unit. It is provided with a recess or opening in a flanged end 26 conforming to the contour of the outer wall of the protection unit and the other portion thereof is contoured in conformity with the shape of the roof.

While I have illustrated and described one embodiment in detail for showing how the invention may be carried out, it will be understood that there may be various changes in construction without departing from the spirit of the invention.

I claim:

1. In combination with a flue pipe in a building construction a fire protection unit comprising a tubular member of smaller diameter inserted within a tubular member of larger diameter to provide a space between the walls of the tubular members, and an annular U-shaped collar providing spaced apart substantially parallel flanges adapted to fit over the corresponding ends of the tubular members to hold them in spaced relation and to enclose the space therebetween.

2. In combination with a flue pipe in a building construction a fire protection unit comprising a tubular member of smaller diameter inserted within a tubular member of larger diameter to provide a space between the walls of the tubular members and annular U-shaped collars providing spaced apart substantially parallel flanges adapted to fit over the opposite corresponding ends of the tubular members to hold them in spaced relation and to enclose the space therebetween.

3. In combination with a flue pipe in a building construction a fire protection unit comprising a tubular member of smaller diameter inserted within a tubular member of larger diameter to provide a space between the walls of the tubular members, non-combustible filling material inserted within the space, and an annular U-shaped collar providing spaced apart substantially parallel flanges adapted to fit over the corresponding ends of the tubular members to secure them together.

4. In combination with a flue pipe in a building construction a fire protection unit comprising a metal tubular member of smaller dimension inserted within a metal tubular member of larger diameter to provide a space between the walls of the tubular members, screw threads provided on the opposite ends of each tubular member, non-combustible filling material inserted within the space, and annular U-shaped collars provided with spaced apart substantially parallel flanges having screw threads for being screw-threadedly attached to the opposite ends of the tubular members for securing same together and enclosing the filling material.

5. In combination with a flue pipe in a building construction a fire protection unit comprising a tubular member having spaced apart inner and outer walls, non-combustible filling material inserted between the walls, annular U-shaped collar means provided with spaced apart substantially parallel flanges for securing the inner and outer walls together and enclosing the filling material, and means for securing the unit in place in the building construction.

6. In combination with a flue pipe in a building construction a fire protection unit comprising a tubular member of smaller diameter inserted within a tubular member of larger diameter to provide a space between the walls of the tubular members, a U-shaped collar provided with spaced apart substantially parallel flanges adapted to fit over the corresponding ends of the tubular members to hold them in spaced relation and to enclose the space therebetween and hanger means attached to the tubular member of larger diameter adapted to be secured to the building structure.

7. In combination with a flue pipe in a building construction a fire protection unit comprising a metal tubular member of smaller dimension inserted within a metal tubular member of larger diameter to provide a space between the walls of the tubular members, screw threads provided on the opposite ends of each tubular member, non-combustible filling material inserted within the space, U-shaped collars provided with spaced apart substantially parallel flanges having screw threads for being screw-threadedly attached to the opposite ends of the tubular members for securing same together and enclosing the filling material and hanger means attached to the tubular member of larger diameter adapted to be secured to the building structure.

JOSEPH A. BROWN.